UNITED STATES PATENT OFFICE.

HENRI RAYMOND VIDAL, OF PARIS, FRANCE.

PROCESS OF MAKING CYANIDS.

SPECIFICATION forming part of Letters Patent No. 596,641, dated January 4, 1898.

Application filed July 24, 1897. Serial No. 645,863. (No specimens.) Patented in England April 10, 1897, No. 9,215.

*To all whom it may concern:*

Be it known that I, HENRI RAYMOND VIDAL, of Paris, France, have invented certain new and useful Improvements in the Manufacture of Cyanids, &c., which improvements are clearly set forth in the following specification, and for which I have obtained British patent No. 9,215, dated April 10, 1897.

I have discovered a reaction, which presents great technical interest, for obtaining cyanogen and its compounds, such as cyanids, cyanates, ferrocyanids, sulfocyanids, &c.

The invention consists, broadly, in heating phospham ($PN_2H$) to a high temperature with a carbon-containing body, such as a carbonate or other salt or compound containing carbon, whereby the nitrogen of the phospham combines with the carbon. Many variations of this reaction are possible, such, for example, as adding iron or sulfur to obtain a ferrocyanid or a sulfocyanid.

For example, phospham heated to a red heat in presence of an alkaline carbonate (of sodium or potassium) gives a cyanate. Thus I heat to a red heat in a suitable crucible or retort six kilograms of phospham and nineteen kilograms of potassium carbonate. The resulting mass is exhausted by water or alcohol, which dissolves the cyanate, leaving a scarcely-soluble phosphate. The reaction may be represented by the following equation:

$$PN_2H + 2CO_3K_2 = PO_4K_2H + 2CNOK.$$

The materials before heating may be pulverized and thoroughly mixed.

If in the foregoing reaction coal carbon be also employed, the result will be a cyanid instead of a cyanate. For the proportions given above I employ 1.50 kilograms of pulverized coal. By replacing the coal by iron the resulting product will be a ferrocyanid. In this case it is expedient not to raise the temperature beyond cherry-red heat in order not to decompose the ferrocyanid formed. In this operation I replace the carbon by eight hundred grams of iron.

Sulfocyanids are obtained by heating the mixture given above for the production of cyanate in presence of sulfur and one kilogram of coal.

Gaseous cyanogen itself may be obtained according to this invention by heating to dark-red heat a mixture of six kilograms of phospham and fifteen kilograms of natural potassium oxalate dried. The reaction is represented by $$PN_2H + C_2O_4K_2 = PO_4K_2H + C_2N_2.$$

If the neutral oxalate be replaced by acid oxalate in presence of coal, hydrocyanic acid will be obtained.

These examples will suffice to enable those skilled in the art to which the invention relates to apply it to the production of various compounds of cyanogen.

Having thus fully described my said invention, what I claim is—

1. The method of obtaining cyanogen or compounds thereof by heating to a high temperature phospham with a carbon-containing body, substantially as described.

2. The method of obtaining cyanogen compounds by heating phospham with a carbonate, substantially as described.

3. The method of obtaining cyanogen compounds by heating phospham with an alkaline carbonate, substantially as described.

4. The method of obtaining cyanids by heating phospham with an alkaline carbonate and the desired substance, substantially as described.

5. The method of obtaining ferrocyanid by heating phospham with an alkaline carbonate and iron, substantially as described.

In testimony whereof I have signed this specification in the presence of two subscribing witnesses.

HENRI RAYMOND VIDAL.

Witnesses:
  EDWARD P. MACLEAN,
  ANTOINE BRENNANNER, Jr.